A. R. DE TARTAS AND F. MLADINICH.
MOTION PICTURE CAMERA.
APPLICATION FILED NOV. 24, 1920.
1,377,322.
Patented May 10, 1921.
2 SHEETS—SHEET 1.
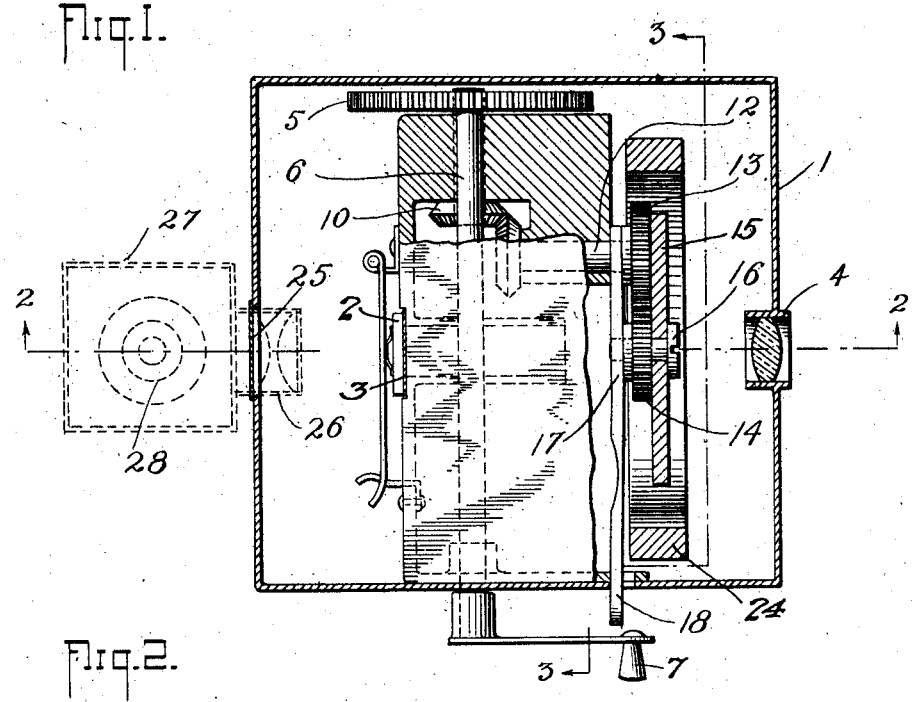
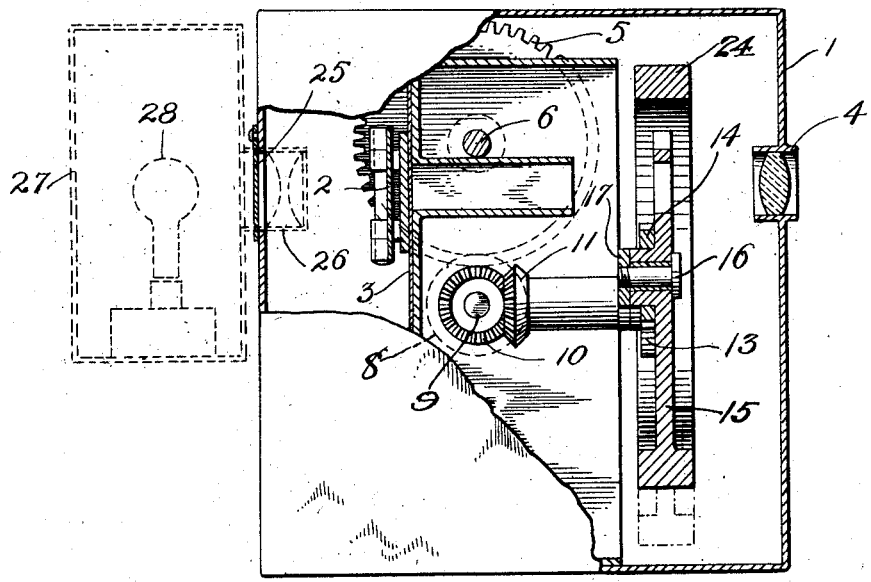
Inventors
A. R. DE TARTAS
F. MLADINICH
By their Attorneys A. R. DE TARTAS AND F. MLADINICH.
MOTION PICTURE CAMERA.
APPLICATION FILED NOV. 24, 1920.
1,377,322.
Patented May 10, 1921.
2 SHEETS—SHEET 2.
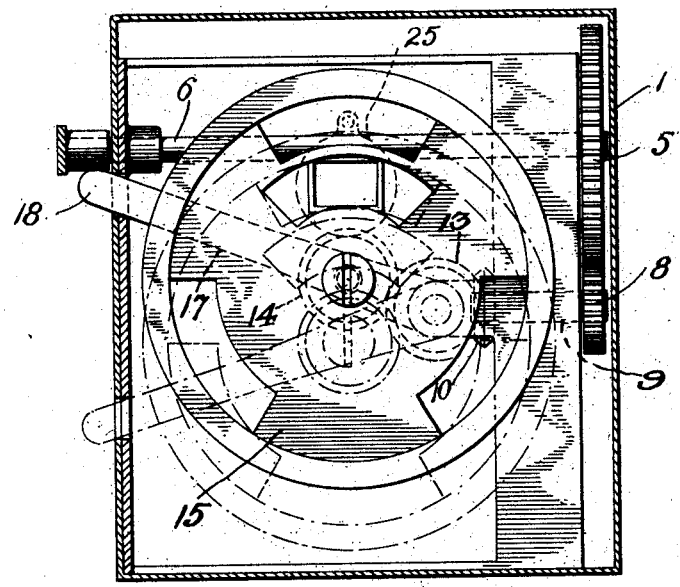
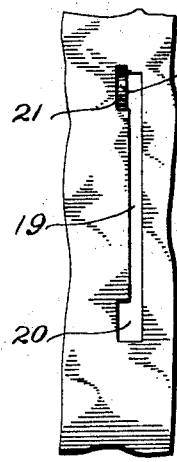
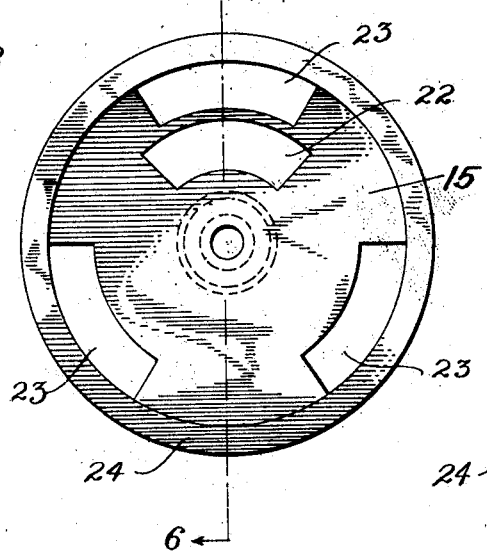
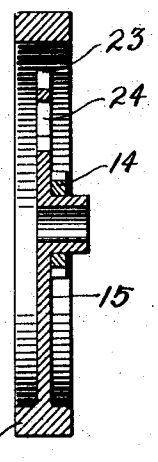
Inventors
A. R. DE TARTAS
F. MLADINICH
By their Attorneys

UNITED STATES PATENT OFFICE.

AUGUSTUS R. DE TARTAS, OF ROCKVILLE CENTER, AND FRANK MLADINICH, OF NEW YORK, N. Y.

MOTION-PICTURE CAMERA.

1,377,322.      Specification of Letters Patent.      Patented May 10, 1921.

Application filed November 24, 1920. Serial No. 426,224.

*To all whom it may concern:*

Be it known that we, AUGUSTUS R. DE TARTAS, a citizen of the United States, residing at Rockville Center, Nassau county, State of New York, and FRANK MLADINICH, a subject of Servia, residing at city of New York, Bronx county, State of New York, have invented a certain new and useful Improvement in Motion-Picture Cameras, of which the following is a full, clear, and exact description.

Our invention relates to improvements in motion picture cameras and has for its object to provide a camera having a unitary shutter adapted to be used for either exposing a strip of film or for projecting pictures, as may be desired. It further has for its object to provide means for adjusting our combination shutter for both of said purposes and to provide means for operating the shutter in either of its two adjusted positions.

One feature of our invention consists in a rotatable shutter having exposure and projecting openings located at different distances from its axis of rotation. Another feature of our invention consists in having a gear connected to said shutter and concentric therewith, and a driving gear in engagement with said first gear at all times. Another feature of our invention consists in providing means for maintaining the distance between the axes of said gears constant and an adjusting handle extending from said means. Another feature consists in a self-contained, picture taking or projecting camera which can be used for either purpose without the removal or substitution of any part other than the lamp container.

The following is a description of an embodiment of our invention, reference being had to the accompanying drawings, in which, Figure 1 shows a plan view of a camera embodying our invention with the cover removed and parts in section;

Fig. 2 shows a vertical section of the camera on the line 2—2, Fig. 1;

Fig. 3 shows a section on the line 3—3, Fig. 1;

Fig. 4 shows a detail of the detents for the shutter adjusting handle;

Fig. 5 is a detail front view of the shutter; and,

Fig. 6 is a section of the same on the line 6—6, Fig. 5.

Referring more particularly to the drawings, 1 is a camera-casing, having a film-guide 2 of any suitable construction for the film 3, and the lens 4. 5 is a driving gear mounted upon the shaft 6 and actuated by the handle 7, the same meshing with a gear 8 upon the shaft 9. This shaft 9 carries a beveled gear 10, which engages with the beveled gear 11 upon a shaft 12 whose other end carries a gear 13. This gear 13 engages with a gear 14 which is mounted upon and in alinement with the axis of a shutter 15 revolubly mounted upon the stud 16 carried by a movable support 17. One end of this support surrounds the shaft 12 so as to maintain the axes of the gears 13 and 14 at a constant distance while the other end is provided with a handle 18 which protrudes through the casing 1 and is adapted to be moved through a slot 19 therein and engaged by and disengaged from detaining recesses or catches 20 and 21.

The shutter is provided with an opening 22, the same being the opening for exposing the film, and a plurality of openings 23, in the present instance three openings, for use when the picture is projected from the film upon a screen. The openings 22 and 23 are at different distances from the axis of revolution of the shutter 15. The shutter 15 can be moved or adjusted so that, for exposure of the film, the opening 22, as the shutter revolves, will pass across the axis of the lens 4. When the shutter is adjusted in the other position, the projection openings 23 will pass across said axis. This use of a plurality of openings for projecting purposes is old and, as is well understood, the position of the film is changed when one of the blank portions of the shutter is opposite the lens, such, for instance, as the portion of the shutter shown at the bottom of Fig. 5. In order to obtain a uniform action for the shutter, we provide the shutter with a weighted rim 24, which causes the shutter to act as a fly-wheel.

The camera is provided with an opening in the rear in line with the film-tube and lens, which can be opened and closed by a pivoted door 25, through which the lens portion 26 of an attachment 27 containing an electric light 28 can be inserted for projecting purposes.

In using our camera for taking a series of pictures upon a film, we raise the handle 18 to its uppermost position, as shown in Fig. 3, bringing the opening 22 in front of the film and then rotate the shutter by the means shown, exposing the film in the ordinary manner.

In projecting we move the handle 18 to the lower position shown in dotted lines in Fig. 3. This brings the openings 23 in line with the lens 4 and when the camera is operated with the shutter in that position, the lamp-carrier 28 having been inserted as shown in dotted lines in Figs. 1 and 2, the picture upon the film is projected through the camera lens upon the screen in the ordinary manner. Any suitable means are employed for preventing the light from entering the camera through the slot 19.

The change in the position of the shutter, in the construction shown, does not in any way interfere with the action of the means for causing its rotation, the gear connected to the shutter having its axis kept at a fixed distance from the axis of the driving gear 13 so that an easily operable shutter capable of being used for both exposure and projecting purposes, and embodied in a single adjustable element, is attained.

As will be evident to those skilled in the art, our invention permits of various modifications without departing from the spirit thereof or the scope of the appended claims.

What we claim is:

1. In a motion picture camera, the combination of a lens, a rotatable shutter having a plurality of openings at different distances from its axis, some of said openings being adapted for projection purposes and the balance being adapted for film exposing purposes, means for varying the distance between the axes of said lens and shutter, and means for rotating said shutter when said axes are at either of two different distances.

2. In a motion picture camera, the combination of a lens, a rotatable shutter having a plurality of openings, some of which are removed from its axis a certain distance and the balance of which are removed from said axis by a different distance, means for moving the axis of said shutter toward and from the axis of said lens, and means for rotating said shutter when its axis has been moved into either of two positions.

3. In a motion picture camera, the combination of a lens, a rotatable shutter having a plurality of openings, some of which are removed from its axis a certain distance and the balance of which are removed from said axis a different distance, means for varying the distance between said axis and the axis of said lens, means for rotating said shutter when said axes are at different distances, said means for rotating the shutter consisting of a gear secured to said shutter so that the axes of said gear and shutter are in alinement, a gear meshing with said first gear, means for holding the axes of said gears at a fixed distance, and means for rotating said second gear.

4. In a motion picture camera, the combination of a lens, a rotatable shutter having a plurality of openings, some of which are removed from its axis a certain distance and the balance of which are removed from said axis a different distance, means for varying the distance between said axis and the axis of said lens, means for rotating said shutter when said axes are at different distances, said means for rotating the shutter consisting of a gear secured to said shutter so that the axes of said gear and shutter are in alinement, a gear meshing with said first gear, means for holding the axes of said gear at a fixed distance, and means for rotating said second shutter, said means for varying the distance consisting of a handle extending from said holding means.

5. In a motion picture camera, the combination of a lens, a rotatable shutter having a series of openings removed from its axis a certain distance, another opening removed from said axis a different distance, means for varying the distance between said axis and the axis of said lens, means for rotating said shutter when said axes are at different distances, said means for rotating the shutter consisting of a gear secured to said shutter so that the axes of said gear and shutter are in alinement, a gear meshing with said first gear, means for holding the axes of said gears at a fixed distance, means for rotating said second gear, said means for varying said distance consisting of a handle extending from said holding means, and a catch carried by the camera casing for holding said handle in actuated position.

AUGUSTUS R. de TARTAS.
FRANK MLADINICH.